UNITED STATES PATENT OFFICE.

EDWARD M. SCHULZ, OF SERGEANTS HALL, AND GEORGE W. HELMLINGER, OF PITTSBURG, PENNSYLVANIA.

PROCESS OF CONVERTING STEEL-SCRAP INTO IRON.

No. 801,274.      Specification of Letters Patent.      Patented Oct. 10, 1905.

Application filed January 24, 1905. Serial No. 242,503.

*To all whom it may concern:*

Be it known that we, EDWARD M. SCHULZ, residing at Sergeants Hall, and GEORGE W. HELMLINGER, residing at Pittsburg, in the county of Allegheny and State of Pennsylvania, citizens of the United States, have invented or discovered new and useful Improvements in Processes of Converting Steel-Scrap into Iron, of which the following is a specification.

Our invention relates to the formation of iron and steel plates, bars, or the like from piles or fagots of iron, steel, or both.

We aim to save what is known in iron-mills as "scrap" by converting it into a new product without the necessity of remelting. We utilize not only scrap or waste iron and steel, but also muck-bars, scrap-bars, steel rails, and the like.

We form the iron or steel scrap bars or rails into piles or fagots and intersperse among the articles constituting the piles or fagots cheap material, as metallic scale or cinder, sand, and "swarf," which is a term used to designate iron and steel borings, filings, turnings, and the like. The words "scale" or "cinder" are given the meaning they have among millmen and are chemically the same. Where metal is heated so that the outside runs—as in a reheating-furnace or under the hammer or in the rolls, for example—the dripping material is usually called "cinder." The term "scale" is more usually applied to the portions of the hot metal which come off when it is too cool to run. Having built the piles or fagots of these elements, we then tie the same together by wires, rods, or bands of iron or steel, and by means of a crane or other mechanical device or by hand, when the piles are not too heavy, they are charged into a heating-furnace, where they remain until they come to a welding heat. They are then drawn from the furnace and passed through rolls or under hammers and pressed into solid sheets, bars, or the like.

It will be noted that we utilize the products which have been rejected as worthless for certain purposes—products which are cheap and in a condition to be practically worthless for the usual purposes of the mill under the present practices. The scale and swarf are saved and incorporated into the substance of the fagots or piles as they are formed into new solid products. It is not essential to use all the cementing materials named; but they may be all used or not, according as the mill produces these waste products. Sand is not essential; but it assists to make the cinder or scale pasty, whereby it will not run out of the piles or fagots so readily. The cinder acts as a decarbonizing agent for the steel and forms a welding cement between the constituent scrap pieces or bars of the piles. It also acts upon the product in such a manner as to prevent blistering. This is an important advantage of our process, as the blistering of iron and steel is a source of great loss, and heretofore a perfect preventive thereof has not been discovered, so far as we are aware.

The piles or fagots may be of any desired length and cross-section; but we prefer to make the same rather small and of a rectangular section. They may be square or flat or have an intermediate shape.

No particular furnace is essential; but we recommend some form of reverberatory furnace. The usual heating-furnace will answer our purpose satisfactorily. Our process is not restricted to the precise furnace we recommend, as the heating might be done otherwise.

We sometimes add charcoal to the material, distributed through the piles or fagots when the blistering of the resulting product is of no importance, as it makes a very soft readily-worked product.

In the claims the words "ferruginous products in a state of small subdivision" are intended to cover scale, cinder, borings, filings, turnings, and material of like nature.

Having described our invention, we claim—

1. The process of converting iron and steel articles, such as scrap, bars, rods, and the like into integral bodies which consists in forming said articles into piles or fagots, interspersed with ferruginous scale or cinder in a state of small subdivision and in sufficient quantity to form a welding material for the said iron or steel, heating the piles or fagots to a welding heat, and then pressing in a suitable manner the same into integral bodies.

2. The process of converting iron and steel articles such as scrap, bars, rods, and the like into integral bodies which consists in forming said articles into piles or fagots, interspersed with sand and ferruginous scale or cinder in a state of small subdivision and in sufficient quantity to form a welding material for the said iron or steel, heating the piles or fagots to a welding heat, and then pressing in a suitable manner the same into integral bodies.

3. The process of converting iron and steel articles, such as scrap, bars, rods and the like into integral bodies which consists in forming said articles into piles or fagots, interspersed with iron scale or cinder, heating the piles or fagots to a welding heat, and then pressing in a suitable manner the same into integral bodies.

Signed at Pittsburg, Pennsylvania, this 23d day of January, 1905.

EDWARD M. SCHULZ.
GEORGE W. HELMLINGER.

Witnesses:
F. N. BARBER,
MARK SCHMID.